United States Patent [19]

De Filippo

[11] Patent Number: 5,713,635
[45] Date of Patent: Feb. 3, 1998

[54] HEADREST FOR MOTOR VEHICLE SEATS

[75] Inventor: Emilio De Filippo, Bruzolo, Italy

[73] Assignee: Gestind-M.B. Manifattura Di Bruzolo Spa, Torino, Italy

[21] Appl. No.: 763,105

[22] Filed: Dec. 10, 1996

[30] Foreign Application Priority Data

Jul. 16, 1996 [IT] Italy ............................. TO96A0612

[51] Int. Cl.⁶ ......................................................... A47C 1/10
[52] U.S. Cl. ........................................... 297/410; 297/391
[58] Field of Search ..................................... 297/410, 391, 297/396, 404, 406, 408

[56] References Cited

U.S. PATENT DOCUMENTS

| | | | |
|---|---|---|---|
| 3,635,527 | 1/1972 | Weber | 297/410 |
| 4,111,484 | 9/1978 | Jaeger | 297/410 |
| 4,390,209 | 6/1983 | Izuno et al. | 297/410 |
| 4,577,904 | 3/1986 | Wiese et al. | 297/410 |

FOREIGN PATENT DOCUMENTS 3636932  3/1988  Germany ..................... 297/410

*Primary Examiner*—Laurie K. Cranmer
*Attorney, Agent, or Firm*—Sughrue, Mion, Zinn, Macpeak & Seas, PLLC

[57] ABSTRACT

A headrest for motor vehicle seats whose support rods are slidable through respective tubular guide members for height adjustment of the headrest resilient body. The support rods are forwardly and rearwardly swingable around a transverse axis placed in proximity of the lower ends of the tubular guide members between a first angular position in which respective stationary restraining engage corresponding positioning notches of the support rods so as to prevent sliding thereof, and a second angular position in which sliding is enabled. The support rods are normally maintained in the first angular position by respective annular sliders slidably mounted over the tubular guide members.

7 Claims, 3 Drawing Sheets

HEADREST FOR MOTOR VEHICLE SEATS

BACKGROUND OF THE INVENTION

The present invention relates to headrests for motor vehicle seats comprising a resilient body, a pair of parallel support rods projecting inferiorly from the resilient body, a pair of tubular guide members to be rigidly secured to the structure of a seat backrest and through which the support rods are upwardly and downwardly slidable, and wherein said tubular guide members are provided with releasable restraining means co-operating with positioning notches formed on said support rods so as to prevent sliding thereof.

In the following description and claims the terms "up", "down", "forward", "rearward" and the like are to be intended referred to the mounted condition of the headrest on a seat backrest on board of a motor vehicle, with reference to the forward motion thereof.

In the traditional headrests of the above-referenced type the restraining means, which are releasable so as to enable upwardly or downwardly sliding of the support rods to allow height adjustment of the headrest resilient body and possibly even withdrawal of the support rods from the respective tubular guide members and removal of the headrest, normally comprise a slider member urged into sliding contact against each support rod, transversally thereto, by the action of a spring. A manually operable push-button is provided for moving the slider member away from the support rod, against the action of the related spring. Such arrangements are known for instance from European patent EP-B-0582765 and from French patent application FR-A-2671587 in the name of the same Applicant. These known solutions, while being relatively functional, have the drawback to involve a certain amount of inconvenients as far as height adjustment operations of the headrest are concerned, particularly in connection with raising thereof, as well as whenever withdrawal thereof from the seat is required, since the user has to operate with both hands the control push-buttons associated to the two support rods and somehow displace the resilient body upwardly.

In order to overcome this drawback, in other known solutions a single restraining member associated to only one of the support rods is provided, thus suppressing the second push-button. In this way however locking stability and safety of the headrest in the set positioning is seriously jeopardized, also with the risk of dangerous accidental removal of the headrest from the seat backrest in case of vehicle crash.

SUMMARY OF THE INVENTION

The object of the present invention is to provide a headrest for motor vehicle seats of the type set forth in the above whose height adjustment does not require operation of control push-buttons, while ensuring safe and steady locking of the support rods relative to the tubular guide members, thus drastically reducing any risks of accidental removal of the headrest.

According to the invention, this object is essentially achieved by virtue of the fact that:

the support rods are slack fitted within said tubular guide members so as to be forwardly and rearwardly swingable substantially around a tilting transverse axis located in proximity of the lower ends of the tubular guide members, movable retaining means are interposed between said tubular guide members and said support rods to normally maintain the support rods in a first angular position relative to said tubular guide members, the restraining means are formed by stationary locking members adapted to engage said positioning notches of the support rods in said first angular position thereof, said movable retaining means enable displacement of said support rods relative to said tubular guide members towards a second angular position in which said locking members are disengaged from said positioning notches.

The movable retaining means may conveniently comprise an annular slider slidably supported by each tubular guide member along a transverse direction with respect to said tilting axis and coupled, as far as sliding along said transverse direction is concerned, with the respective support rod.

The invention provides two alternative embodiments, in each of which sliding of the slider member along the transverse direction is operated by swinging of the support rods, when the headrest resilient body is manually displaced.

In a first embodiment the slider members are provided with respective resilient thrust means urging the support rods towards said first angular position.

In a second embodiment each slider member is provided with snap positioning means adapted to maintain the respective support rod selectively in said first or in said second angular position. Accordingly a steady positioning of the support rods in both positions is provided, and the headrest resilient body has to be displaced for shifting from one to the other angular position.

BRIEF DESCRIPTION OF THE DRAWINGS

The invention will now be disclosed in detail with reference to the accompanying drawings, purely provided by way of non-limiting example, in which.

DETAILED DESCRIPTION OF THE INVENTION

Figure 1:
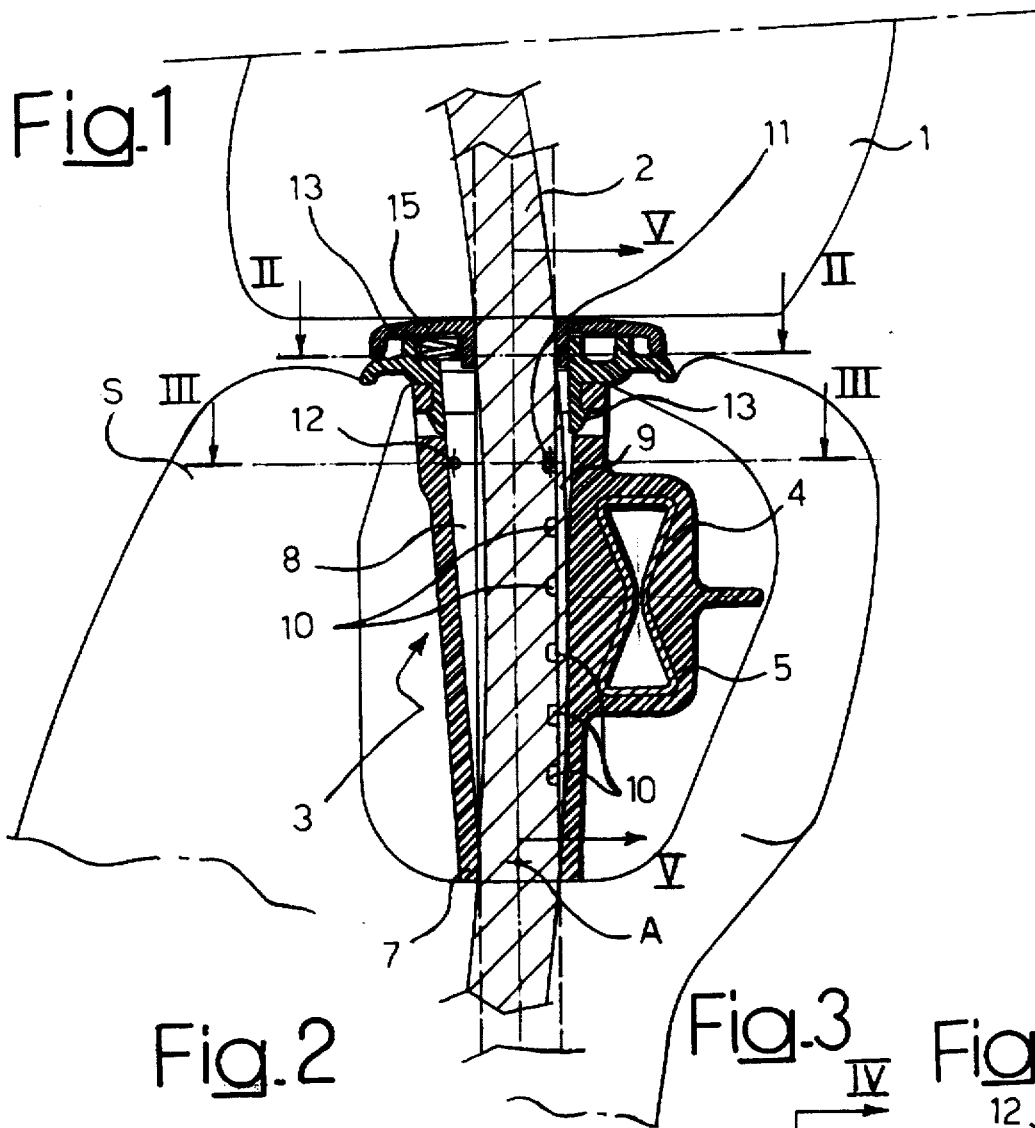
FIG. 1 is a partially vertically sectioned diagrammatic view of a headrest for motor vehicle seats according to the invention.
Figure 2:
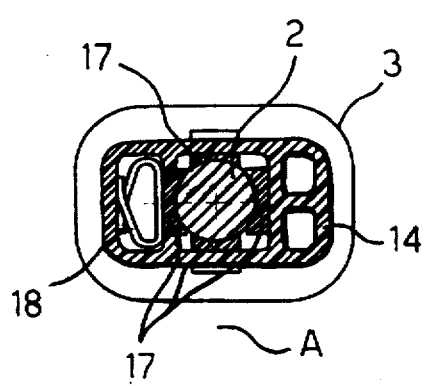
FIG. 2 is a horizontally sectioned view along line II—II of FIG. 1.

Referring initially to FIGS. 1 through 5, a headrest for motor vehicle seats essentially comprises a resilient body or pillow 1, normally made of foamed plastic material and incorporating a supporting framework, not shown in the drawings since generally conventional, in turn connected in a rigid or swingable fashion to a pair of support rods 2, only one of which is shown in FIG. 1, projecting from the base of the resilient body 1. In the mounted condition of the headrest the resilient body 1 is placed in a height adjustable way, such as clarified here below, on top of the backrest S of a motor vehicle seat, and the support rods 2 extend into this seat S and are connected to the frame thereof in the way which will also be clarified in the following.

As shown in a superimposed way in FIG. 1, the rods 2, which are parallel to each other, may have a straight or a slightly curved or arcuate design, with their concavity facing towards the front side of the vehicle (towards the left with reference to FIG. 1), whereby when the resilient body 1 is raised it does not move backwardly, but is forwardly displaced in spite of the usual backward inclination of the backrest S.

Each support rod 2 is slidably fitted through a respective tubular guide member, generally designated as 3, rigidly secured to the framework of the backrest S. The arrangement disclosed with reference to the tubular guide member 3 shown in the drawings identically applies also to the other tubular guide member, not shown.

In the case of the example, the tubular guide member 3 is formed by a plastic material bush which is overmoulded, in correspondence of a rear enlarged portion 4 thereof, on a section 5 having a non-circular cross-section of a metal bar 6 (FIG. 5) which constitutes the upper transverse element of the frame of the backrest S. However it is to be pointed out that this configuration, while being advantageous, is purely indicative, since the tubular guide members 3 could simply consist of metal bushes fixed by welding to the transverse element 6.

As clearly shown in FIG. 1, while the support rod 2 has a circular cross-section with constant diameter, the cross-section of the bush 3 is progressively enlarged upwardly, starting from its lower end 7, so as to define with respect to the support rod 2 a front interspace 8 and a rear interspace 9. Accordingly the support rod 2 is directly contacting the inner wall of the bush 3 only in the area of the lower end 7 thereof, while superiorly the slack defined by the front interspace 8 and by the rear interspace 9 allows the support rod 2 to swing forwardly and rearwardly, substantially around a transverse horizontal axis A, which is just situated in proximity of the lower end 7 of the bush 3.

Figures 3, 4:
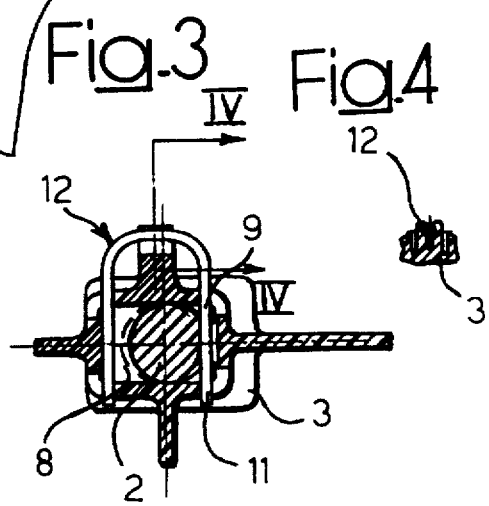
FIG. 3 is a horizontally sectioned view along line III—III of FIG. 1.
FIG. 4 is a vertically sectioned view along line IV—IV of FIG. 3.
Figure 5:
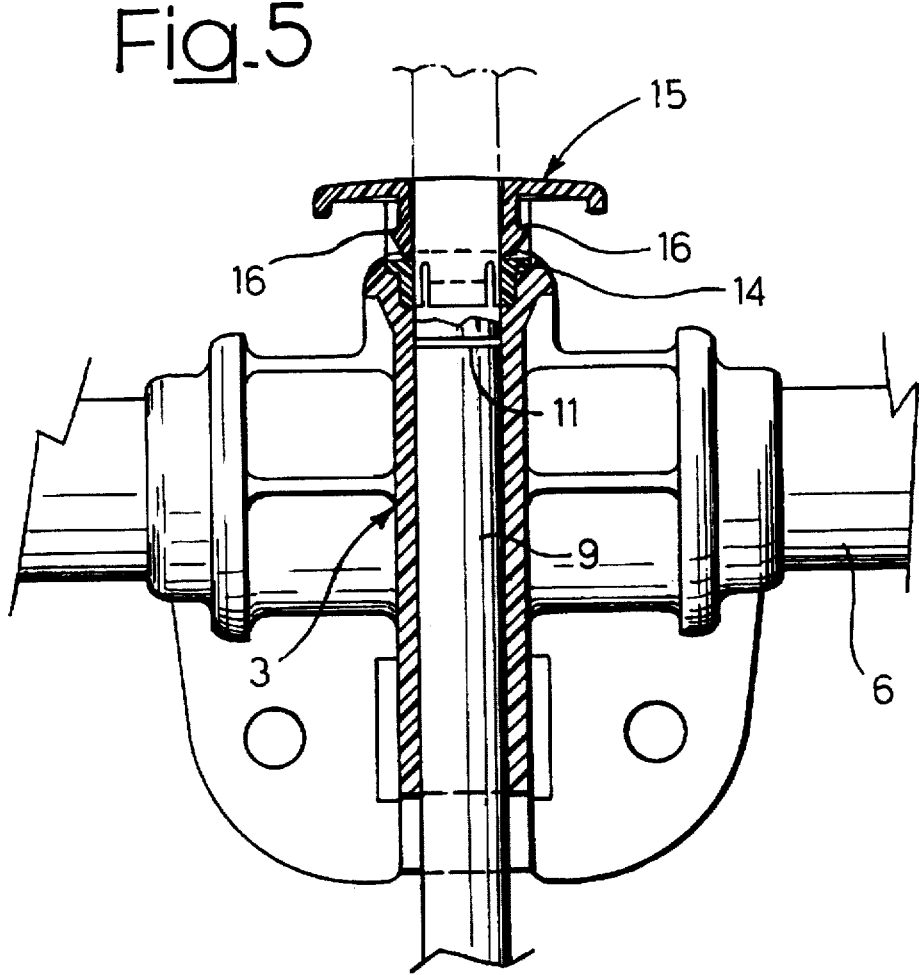
FIG. 5 is a vertically sectioned and simplified view along line V—V of FIG. 1.
Figure 7:
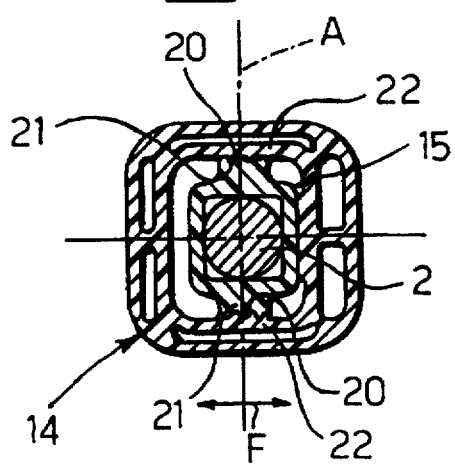
FIG. 7 is a horizontally sectioned view along line VII—VII of FIG. 6.
Figure 8:
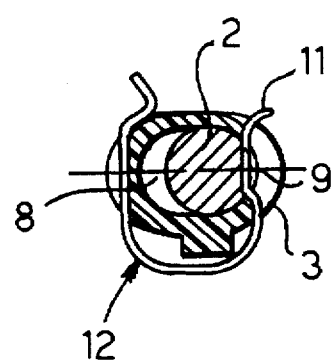
FIG. 8 is a horizontally sectioned view along line VIII—VIII of FIG. 6.
Figure 9:
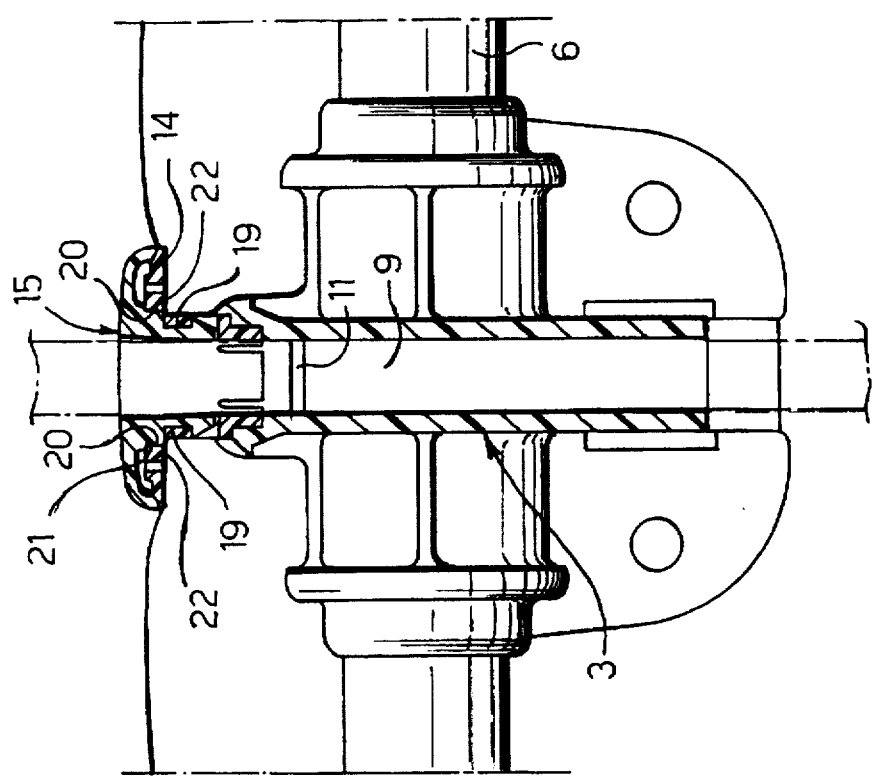
FIG. 9 is a vertically sectioned and simplified view along line IX—IX of FIG. 6.
Figure 6:
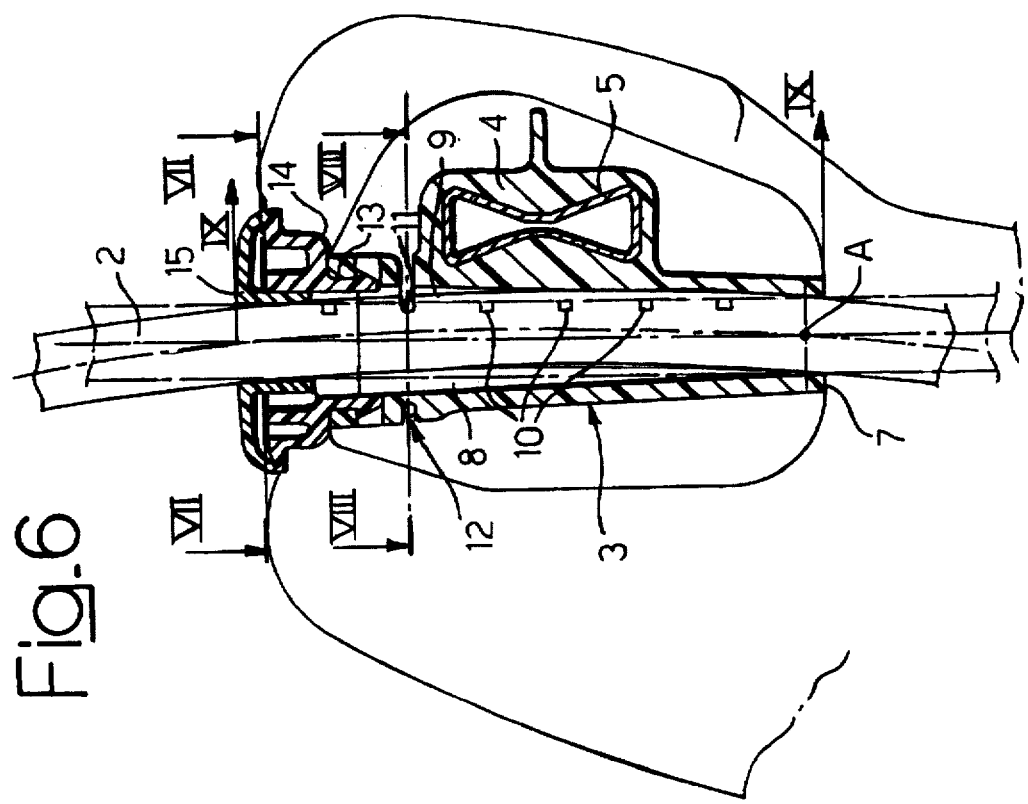
FIG. 6 is a view similar to FIG. 1 showing a variant of the headrest according to the invention.

The support rod 2 is formed along its rear surface, i.e. the surface facing towards the rear interspace 9, with a number of spaced-apart notches 10 adapted to co-operate, such as clarified here below, with a stationary locking member 11 formed by one branch of a U-shaped metal bar 12 horizontally fitted and secured within the bush 3, as shown in detail in FIG. 4, well above the tilting axis A. The locking member 11 extends transversally across the rear interspace 9 and normally engages one of the notches 10 of the support rod 2, such as shown in FIGS. 1 and 3.

A tubular support member 14, also made of plastic moulded material and to which an annular slider 15 is coupled, is secured on top of the bush 3, by means of a snap-fit coupling 13. This annular slider 15 is slidably connected with respect to the tubular support member 14 along lateral guide elements 16 in a horizontal direction, indicated as F in FIG. 2, perpendicularly to the tilting axis A. The cavity of the annular slider 15 is delimited by a sectional wall 17 through which the support rod 2 is frictionally slidable. A front plate spring 18 provided between the tubular support member 14 and the annular slider 15 urges the latter to the position shown in the drawings, so as to normally maintain the support rod 2 in the position also shown in the drawings, in which same is angularly displaced relative to the bush 3 towards the rear interspace 9, so as to interfere with the locking member 11. In this position the locking member 11 can thus engage one of the notches 10 of the support rod 2, thereby preventing upwardly or downwardly sliding thereof relative to the bush 3.

In order to allow the sliding motion, to the aim of adjusting the height position of the resilient body 1 or fully withdraw the headrest from the backrest S, it is simply necessary to manually displace the resilient body 1 forwardly, thus rotating each support rod 2 around the tilting axis A towards the front interspace 9 of the respective bush 3 and disengaging the related locking member 11 from the notch 10. Accordingly, the height position of the resilient body can easily be adjusted. Then, simply releasing the resilient body 1, the springs bring the support rods 2 again to the initial angular position, thus allowing the locking members 11 to engage the corresponding nearest notches 10.

It will be apparent from the above description that, in the embodiment according to FIGS. 1 through 5, disengagement motion of the annular sliders 15 is operated by means of swinging of the support rods 2 around the tilting axis A, which in turn is operated acting on the resilient body 1, while return to the starting position is performed by the springs 18, simply releasing the resilient body 1.

In the variant of the invention shown in FIGS. 6 through 9, the return swinging of the support rods 2 is instead also operated by means of the manual displacement of the resilient body 1. To such effect in this variant, in which parts which are identical or similar to those already previously disclosed are indicated with the same numeral references, the annular slider 15, slidable along the direction F (FIG. 7) relative to the tubular support member 14 by means of lateral sliding couplings 19, is provided with lateral indentations 20 engaging complementary lateral indentations 21 formed in correspondence of elastically yielding sections 22 of the tubular support member 14.

Accordingly each annular slider 15 can be displaced through a snapped and stepped motion along the direction F between the position shown in the drawings, in which the respective support rod 2 is shifted towards the rear interspace 9 so as to perform engagement between the locking member 11 and one of the notches 10 thereof, and an advanced position in which the support rod 2, tilted around the transverse axis A, is shifted towards the front interspace 8 so as to disengage the locking member 11 from the notches 10, thus enabling upwardly or downwardly sliding of the support rod 2. The indentations 20 and 21 steadily keep one or the other set position, until return to the starting position. Displacement of each annular slider 15 and the consequent swinging of the respective support rod 2 between the above disclosed angular positions is normally operated by displacing, in a convenient and easy way, the resilient body 1 of the headrest.

In summary, in both embodiments of the invention height adjustment or withdrawal of the headrest simply require manual forward displacement of the resilient body 1 and thereafter translation thereof relative to the backrest S of the seat.

Naturally the details of construction and the embodiments may be widely varied with respect to what has been disclosed and illustrated, without thereby departing from the scope of the present invention, such as defined in the appended claims.

What is claimed is:

1. A headrest for a motor vehicle seat having a backrest with a bearing structure, comprising a resilient body, a pair of parallel support rods having respective lower ends projecting from said resilient body, a pair of tubular guide members to be rigidly secured to said structure of the seat backrest and through which said support rods are upwardly and downwardly slidable, wherein said tubular guide members are provided with releasable restraining means co-operating with positioning notches formed on said support rods so as to prevent sliding thereof, sand wherein:

- said support rods are slack fitted within said tubular guide members so as to be forwardly and rearwardly swingable substantially around a tilting axis located in proximity of said lower ends of said tubular guide members,
- movable retaining means are interposed between said tubular guide members and said support rods to normally maintain said support rods in a first angular position relative to said tubular guide members,
- said restraining means are formed by a stationary locking member adapted to engage one of said positioning notches of said support in said first angular position thereof, and
- said movable retaining means enable displacement of said support rods relative to said tubular guide members towards a second angular position in which said locking member is disengaged from said one of said positioning notches,
- wherein said movable retaining means comprise an annular slider member slidable supported by each tubular guide member along a transverse direction with respect to said tilting axis and coupled, as far as sliding along said transverse direction is concerned, with the respective support rod, and wherein said slider member is provided with snap positioning means to maintain said support rod selectively in said first or in said second angular position.

2. Headrest according to claim 1, wherein sliding of said annular slider member along said transverse direction is operated by means of displacement of said resilient body.

3. Headrest according to claim 1, wherein said slider member is provided with resilient thrust means urging said support rod towards said first angular position.

4. Headrest according to claim 1, wherein each of said tubular guide members has a progressively enlarged transverse cross-section from said tilting axis upwardly, so as to define a front interspace and a rear interspace with respect to the corresponding support rod, and wherein said locking member comprises a bar element extending in said rear interspace, said bar element being parallel to and spaced-apart from said titling axis and defining a respective stationary locking member.

5. Headrest according to claim 1, wherein said support rods are arcuate with their concavity facing forwardly.

6. Headrest according to claim 1, wherein said support rods are straight.

7. Headrest according to claim 1, wherein said tubular guide members are formed by moulded plastic material bushes adapted to be overmoulded on mounting bar which is an upper transverse member of said structure of the seat backrest.

\* \* \* \* \*